May 9, 1950 P. W. WHITE 2,507,073
LETTER SCALE
Filed March 21, 1946 2 Sheets-Sheet 1

Inventor:
Paul W. White
By: Thiess, Olson & Mecklenburger
Attys.

May 9, 1950 P. W. WHITE 2,507,073
LETTER SCALE
Filed March 21, 1946 2 Sheets-Sheet 2

Inventor:
Paul W. White
By Hiess, Olsen & Mecklenburg
Attys.

Patented May 9, 1950

2,507,073

UNITED STATES PATENT OFFICE 2,507,073

LETTER SCALE

Paul W. White, New Haven, Conn., assignor to Parva Products Company, Chicago, Ill., a corporation of Delaware Application March 21, 1946, Serial No. 655,992

3 Claims. (Cl. 265—49)

1

This invention relates to combination instruments or tools of the type adapted for weighing, measuring, drafting and fabricating purposes, more particularly to combination instruments useful as letter-weighers, rulers, levels and miters, among other uses, and the invention has for an object the provision of an attractive, reliable and readily usable instrument of this type for home, office and shop uses.

Various types of combined letter-weighers and rulers or similar instruments have heretofore been proposed in which the ruler portion of the instrument serves as the scale beam for determining approximately the weight of mailable articles such as letters. Prior instruments of this type, however, have either been bulky and difficult to manipulate, or have been inaccurate due to the necessity of providing means for properly supporting the article to be weighed in relation to the scale beam and its fulcrum. Accordingly, it is a further object of this invention to provide a combination instrument of the above character incorporating means for positively and readily gripping the letter or similar article to support it in proper position for weighing and in accurately predetermined relation to the scale beam and fulcrum, the gripping means being so arranged as not to interfere with the use of the instrument as a ruler, protractor, compass, level, French curve or magnifier.

In carrying out the invention in one form I provide an elongate, relatively thin, flat scale beam adapted to be fulcrumed in edgewise relation about a point intermediate the ends thereof, the beam having a slot extending transversely from the lower edge at a point closely adjacent one end of the beam, the portion of the beam beyond the slot forming a resilient finger for gripping a letter in the slot, the slot being tapered inwardly from its lower end to receive and hold the letter in wedged relation.

Mounted on the scale beam is a spirit level for indicating variations of the scale beam from the horizontal during weighing of the supported letter or article, the spirit level being in accurately predetermined relation to the lower straight edge of the scale beam, which straight edge may serve as a ruler, and the support for the spirit level including a V-shaped member the converging edges of which are in accurately predetermined angular relation to the straight edge of the scale beam, whereby the instrument may be used for mitering purposes.

For a more complete understanding of the invention, reference should now be had to the drawings in which.

Figure 1:
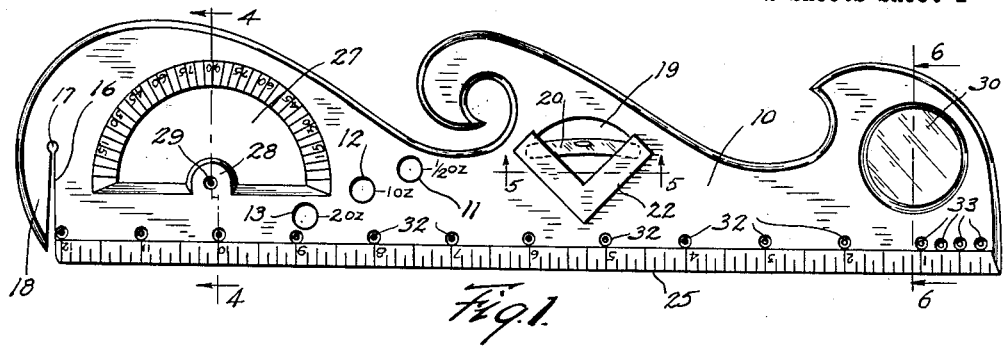
Fig. 1 is a side elevational view of a combination instrument embodying the present invention.

Referring now to Figs. 1 to 6, inclusive, of the drawings, the invention is shown as embodied in a combination instrument comprising a thin flat body member 10 which serves as the scale beam when the instrument is used as a letter weigher, and which is provided intermediate its ends with a plurality of apertures 11, 12 and 13 adapted to receive a fulcrum element such as a common pen or pencil 14 (Figs. 2 and 3), whereby the scale beam 10 may be fulcrumed at selected points for weighing purposes. Adjacent one end, the scale beam 10 is provided with a slot 16 which extends laterally of the scale beam from the lower edge thereof, the slot being tapered inwardly, as shown, and terminating in an aperture 17 having a diameter greater than the width of the slot 16 at its inner end. The portion of the scale beam 10 which lies between the slot 16 and the lefthand end of the scale beam, as viewed in Fig. 1, forms a resilient finger portion 18 adapted to grip in wedging relation a letter or similar article when the letter is forced upwardly into slot 16.

Figure 2:
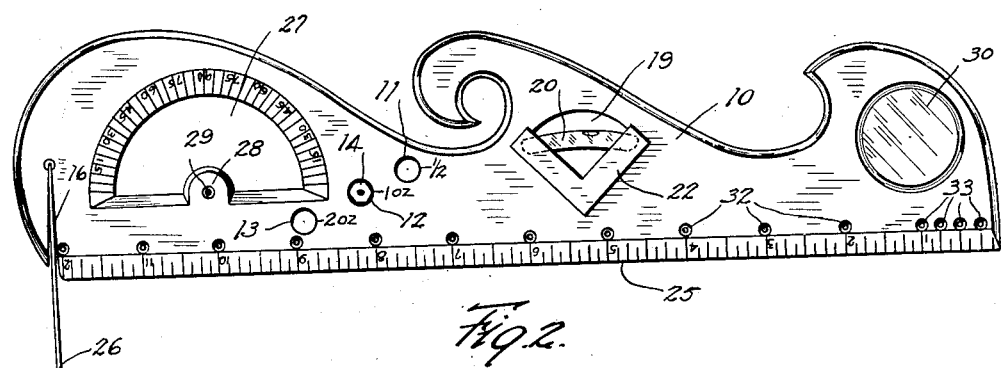
Fig. 2 is a similar view showing the combination instrument of Fig. 1 in use as a letter weigher.

In order to provide for accurate determination of the weight of the letter or similar article being weighed, the body portion 10 of the instrument is provided adjacent the central portion thereof with an aperture 19 in which is disposed a spirit level 20, the opposite ends of which are supported in suitable depressions 21 (Fig. 5) which extend partially through the body portion 10. Overlying the ends of the spirit level 20 and secured to the body portion 10 by cement or other suitable securing means is a supporting element 22 which is substantially V-shaped in form, and which projects outwardly from the face of the body portion 10 as shown best in Fig. 3. Although the supporting member 22 may be secured to the body portion 10 in any suitable fashion, the body portion 10 is preferably provided with a pair of outstanding members 24 adapted to be received in suitable depressions in the member 22 so as accurately to position this supporting member 22 in proper angular relation to the lower edge 25 of the body portion or scale beam 10, which straight edge 25 may, as shown in Figs. 1 and 2, be provided with suitable indicia for use as a ruler.

When it is desired to weigh a letter or similar article employing the instrument thus far described, it is necessary only to wedge the letter upwardly into the slot 16 until it is securely gripped by the edges of the slot and to then insert a pencil or other suitable fulcrum device through one of the apertures 11, 12 and 13. In Fig. 2 the fulcrum device or pencil 14 is shown as extending through the aperture 12 which is so located as to provide and accurate balance of the scale beam when the letter weighs 1 ounce. In Fig. 2, however, the letter 26 carried in the slot 16 can be assumed to weigh slightly more than 1 ounce, and it will be observed that the scale beam 10 is tilted in a counterclockwise direction about the pencil 14 as indicated by the position of the bubble in the spirit level 20 and as likewise indicated by the inclination of the lower straight edge 25 of the instrument.

Figure 3:
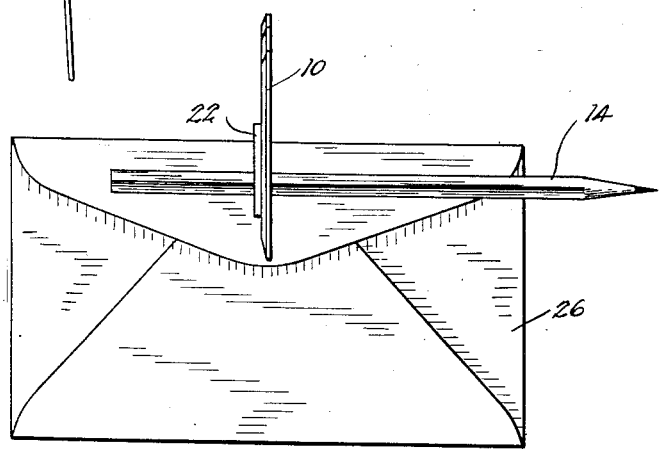
Fig. 3 is an end elevational view of the letter weigher illustrated in Fig. 2.

By use of the spirit level 20 slight over- and under-weights may be observed, thus insuring the application of a proper amount of postage to the letter 26. The provision of the aperture 17 at the upper end of the slot 16 makes it possible to insert the letter to a position in which the walls of the slot 16, at its narrowest portion, grip the letter at a point below the upper edge thereof, thus insuring proper gripping of the letter at all times. For accurate weighing it is desirable that the letter be inserted in the slot 16 at approximately its mid-portion as shown in Fig. 3.

Although the relative location of the apertures 11, 12 and 13 with respect to the gripping slot 16 may be varied within limits, it has been found that the sensitivity of the instrument increases as the transverse distance of the apertures from a line through the inner end of the slot 16 increases. Accordingly, the aperture 13 which is located to provide balance of the instrument at approximately 2 ounces is located more closely adjacent the straight edge 25 than the aperture 12, and the ½ ounce aperture 11 is located at the greatest distance from the straight edge 25, thus providing increased sensitivity at the higher weights.

The spirit level 20 not only serves as a balance indicator when the instrument is used as a weighing device, but likewise is useful in combination with the straight edge 25 as a conventional carpenter's level. In other words, when the straight edge 25 is laid on a surface with the body portion 10 in edgewise relation to the surface, the spirit level 20 will indicate by its position any variation of the surface from the horizontal. By arranging the support for the spirit level in the form of a V accurately positioned with respect to the straight edge 25 and by so constructing the V-shaped member that it projects forwardly from the front surface of the body portion 10, means are provided whereby the instrument may be used as a miter. For example, if the instrument is laid face down on a board to be mitered and one edge of the V-shaped support 22 brought into contact with one edge of the board, the straight edge 25 will then extend at a substantially 45 degree angle across the surface of the board. Alternately, the body portion 10 may be laid face up on the article to be mitered with the straight edge 25 coincident with an edge of the article and a second straight edge brought into alignment with one edge or the other of the V-shaped support, whereupon a 45 degree line may be drawn along the second straight edge.

In order further to increase the uses to which the improved instrument may be put, the edge thereof opposite from the straight edge 25 is preferably formed to follow the lines of standard so-called French curves used by draftsmen and architects. Likewise, as shown, the body portion 10 is provided with an arcuate aperture 27, the straight side of which is provided with an inwardly extending projection 28 having a central aperture 29 therein and the arcuate edge of the aperture 27 is tapered, as shown best in Fig. 4, and provided with suitable angular graduations thereby providing a protractor for measuring angularity.

Adjacent the end of the body member 10 opposite from the protractor the body member is provided with a magnifying or reading glass 30 supported in a suitable aperture through the body member. Although the magnifying glass 30 may be supported in any suitable manner, depending upon the material from which the body member 10 is formed, it has been found preferable, when the body member is formed of moldable plastic material of a type readily available on the market, to form an aperture therein surrounded by a ledge 31 on which the lens or glass 30 may rest. Thereafter the glass 30 may be permanently secured in the body member 10 by flowing or spinning a part of the material forming the body portion over the edge of the glass 30. It will of course be understood that the body member 10 may be formed of any suitable material, but the use of moldable materials of the type referred to above makes possible the provision of an attractive lightweight instrument which may readily be manufactured.

Figure 4:
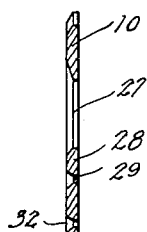
Fig. 4 is a detail sectional view taken along the line 4—4 of Fig. 1.
Figure 5:
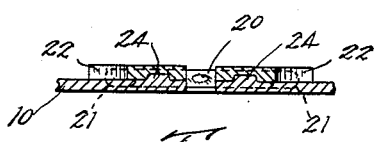
Fig. 5 is a fragmentary sectional view taken along the line 5—5 of Fig. 1.
Figure 6:
Fig. 6 is a detail sectional view taken along the line 6—6 of Fig. 1.

Disposed at suitable intervals along the graduations for the straight edge 25 is a series of apertures 32 shaped, as shown best in Fig. 4, to receive the point of a pencil. Adjacent one end of the straight edge 25 the body portion 10 is provided with additional apertures 33 adapted to receive a pin or thumb tack. Through proper utilization of the apertures 32 and 33 the instrument may be employed to draw arcs or circles. For example, a pin or thumb tack, or similar centering element, may be inserted through a selected one of the apertures 33 to provide a point of rotation, and the point of a pencil may be inserted through a desired one of the apertures 32 and the instrument rotated about the pin or thumb tack to draw a circle or any desired portion thereof. The provision of four of the apertures 33 spaced on ¼" centers permits the execution of arcs or circles of any desired radius varying in ¼" increments.

Figure 7:
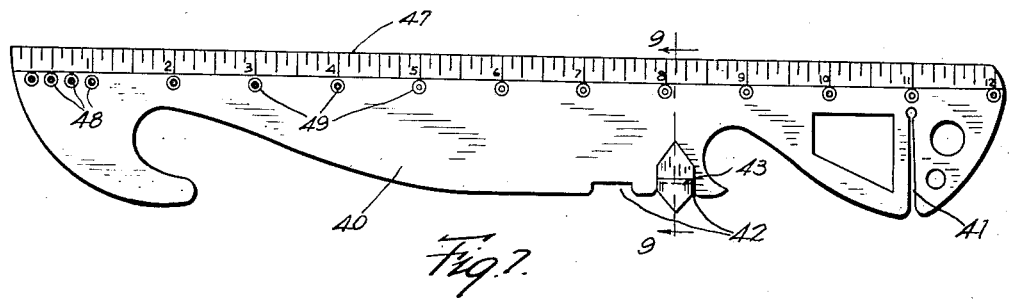
Fig. 7 is a side elevational view of a combined letter weigher and rule constituting a further embodiment of this invention.
Figure 8:
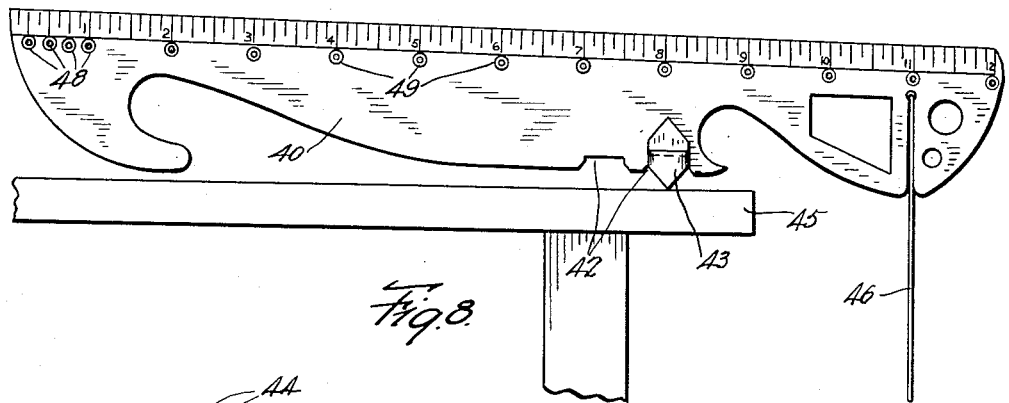
Fig. 8 is a side elevational view showing the instrument of Fig. 7 in use as a letter weigher.
Figure 10:
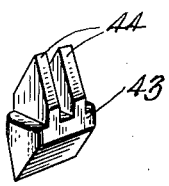
Fig. 10 is a detail perspective view of the fulcrum element employed with the instrument of Fig. 7.
Figure 9:
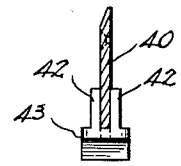
Fig. 9 is a detail sectional view taken along the line 9—9 of Fig. 7.

In the embodiment of the invention shown in Figs. 7 to 10, inclusive, a somewhat different form of fulcrum means is provided. As shown, the instrument proper comprises a thin flat body or scale beam 40 having at one end thereof a letter-receiving slot 41 similar to the slot 16 of the previously described embodiment, but in place of the fulcrum apertures 11, 12 and 13 the body member 40 is provided with a plurality of notches 42 for receiving a separate knife-edged fulcrum element 43 which, as shown best in Fig. 10, is provided with a pair of spaced, upwardly extending arms 44 for receiving the body member 40 when it is desired to use the instrument as a letter weigher. The notches 42 serve to position the fulcrum element 43 longitudinally of the scale beam or body member 40, and it will be understood that these notches are properly located so as to provide for balancing the instrument when letters of predetermined weight are carried in the slot 41. In Fig. 8 the instrument is shown in use as a letter weigher, the fulcrum element 43 resting on a flat surface such as the table top 45, and it will be observed that the weight of the letter has caused the left-hand end of the element 40 to rise off the table, thereby indicating that the letter 46 is slightly over the weight corresponding to the notch 42 in which the fulcrum element is engaged.

As in the previously described embodiment of the invention, the instrument body 40 is provided with suitable curved surfaces to provide French curves and with a straight edge 47 which may be used as a ruler, suitable apertures 48 and 49 being provided for use in drawing arcs or circles. It will of course be understood that the instrument shown in Figs. 7 to 10, inclusive, may be provided with any or all of the additional features of the embodiment shown in Fig. 1, i. e., the protractor, the spirit level and the magnifying or reading glass.

Figure 11:
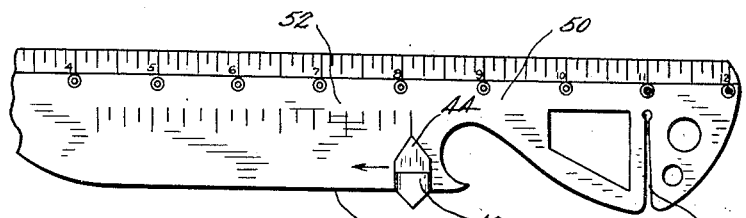
Fig. 11 is a fragmentary side elevational view of another embodiment of the invention employing the same fulcrum element as the instrument of Fig. 7.

In Fig. 11 a further embodiment of the invention is shown comprising a body member or scale beam 50 which is in all respects similar to the scale beam 40 of Fig. 7 except that the notches 42 have been omitted, the fulcrum element 43 being adjustable to any desired position along the straight edge portion 51 and a suitable scale 52 being provided for cooperation with the arms 44 of the fulcrum element 43 to indicate the weighing position of the fulcrum relative to the letter-holding slot 53.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A letter weigher comprising a flat scale beam adapted to be fulcrumed in edgewise relation about a point intermediate the ends thereof, said scale beam having a letter-supporting slot extending transversely of said beam from the lower edge thereof adjacent one end, said slot tapering inwardly to receive and hold a letter or the like in suspended wedged relation.

2. A letter weigher comprising a flat scale beam adapted to be fulcrumed in edgewise relation about a point intermediate the ends thereof, said scale beam having a letter-supporting slot extending transversely of said beam from the lower edge thereof adjacent one end, said slot tapering inwardly and communicating at its inner end with an aperture of greater diameter than the slot width at said inner end, whereby a letter when forced into said slot is effectively gripped adjacent its upper edge by the walls of said slot and is supported on said scale beam for weighing.

3. A letter weigher comprising an elongate flat scale beam formed of molded material and adapted to be fulcrumed in edgewise relation about a point intermediate the ends thereof, said beam having a slot extending transversely from the lower edge thereof closely adjacent one end, the portion of said beam between said slot and said adjacent end forming a resilient finger for gripping a letter in said slot, said slot being tapered inwardly from its lower end to receive and hold the letter in suspended wedged relation.

PAUL W. WHITE.

REFERENCES CITED

The following references are of record in the file of this patent:

UNITED STATES PATENTS

| Number | Name | Date |
| --- | --- | --- |
| 193,744 | Wyckoff | July 31, 1877 |
| 199,776 | Becker | Jan. 29, 1878 |
| 440,959 | O'Marra | Nov. 18, 1890 |
| 601,224 | Eaton | Mar. 22, 1898 |
| 798,695 | Oehrle | Sept. 5, 1905 |
| 2,097,026 | Flanagan | Oct. 26, 1937 |
| 2,335,693 | Osterberg | Nov. 30, 1943 |